(12) United States Patent
Wafzig

(10) Patent No.: US 7,069,799 B2
(45) Date of Patent: Jul. 4, 2006

(54) VEHICLE GEARBOX

(75) Inventor: Jürgen Wafzig, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 224 days.

(21) Appl. No.: 10/475,469

(22) PCT Filed: Apr. 18, 2002

(86) PCT No.: PCT/EP02/04268

§ 371 (c)(1),
(2), (4) Date: Oct. 21, 2003

(87) PCT Pub. No.: WO02/086352

PCT Pub. Date: Oct. 31, 2002

(65) Prior Publication Data

US 2004/0112156 A1 Jun. 17, 2004

(30) Foreign Application Priority Data

Apr. 24, 2001 (DE) .......................... 101 20 060

(51) Int. Cl.
F16H 3/08 (2006.01)

(52) U.S. Cl. ............................. 74/329; 74/331; 74/335

(58) Field of Classification Search ............... 74/329, 74/331, 335
See application file for complete search history.

(56) References Cited

U.S. PATENT DOCUMENTS

| | | | |
|---|---|---|---|
| 3,600,963 A | | 8/1971 | Portmann ................... 74/360 |
| 4,614,126 A | | 9/1986 | Edelen et al. ............... 74/333 |
| 4,685,343 A | * | 8/1987 | Ehrlinger et al. ............ 74/331 |
| 4,757,726 A | | 7/1988 | Yamaguchi et al. ...... 74/473 R |
| 4,802,384 A | | 2/1989 | Schwarz et al. ............. 74/745 |
| 5,370,013 A | * | 12/1994 | Reynolds et al. ............ 74/330 |
| 5,390,561 A | * | 2/1995 | Stine ........................... 74/331 |
| 5,408,895 A | * | 4/1995 | Chan et al. ................... 74/335 |
| 5,421,216 A | * | 6/1995 | Stine ........................... 74/331 |
| 5,819,601 A | | 10/1998 | Kuhn ........................... 74/745 |
| 5,881,600 A | * | 3/1999 | Fan ............................. 74/329 |
| 5,946,970 A | * | 9/1999 | Fraley et al. ................. 74/325 |
| 6,012,345 A | * | 1/2000 | Wafzig et al. ................. 74/50 |
| 6,647,817 B1 | * | 11/2003 | Kobayashi ................... 74/359 |
| 6,718,841 B1 | * | 4/2004 | Schepperle .................. 74/359 |

FOREIGN PATENT DOCUMENTS

| | | |
|---|---|---|
| DE | 1 943 476 | 3/1970 |
| DE | 28 02 166 | 7/1979 |
| DE | 38 22 330 A1 | 7/1989 |
| DE | 44 11 114 A1 | 10/1995 |
| EP | 0 625 652 A1 | 11/1994 |
| EP | 0 737 828 A1 | 10/1996 |
| EP | 0 882 908 A2 | 12/1998 |
| JP | 02026346 A  * | 1/1990 |

OTHER PUBLICATIONS

Looman, Johannes, "Zahnradgetriebe", Springer–Verlag, Berlin, 1970, pp. 180–183.

* cited by examiner

Primary Examiner—Saul Rodriguez
Assistant Examiner—David D. Le
(74) Attorney, Agent, or Firm—Davis & Bujold, P.L.L.C.

(57) ABSTRACT

A vehicle gearbox having an input shaft, an output shaft and a countershaft, which is arranged to parallel to the axis of shafts and can be drivingly connected by gear sets to shafts via separating clutches, wherein four gear sets and a reversing gear set having an idler and a fixed gear form a main gearbox group and two gear sets having an idler and a fixed gear form a downstream area gearbox. The separating clutches and the idlers of the main gearbox group are arranged on the input shaft while the idlers of the area gearbox group rest on the countershaft, wherein the gearbox diagram, the switchgear and the gearbox housing for a vehicle gearbox with six forward gears are the same as those for a vehicle gearbox with eight forward gears.

5 Claims, 3 Drawing Sheets

| Gear Set | i |
|---|---|
| I | 3.50 |
| II | 2.45 |
| III | 1.72 |
| IV | 1.20 |
| V | 0.29 |
| VI | 1.20 |
| W | 3.16 |

| Separating Clutch Gear | a | b | c | d | e | f | g | u | φ |
|---|---|---|---|---|---|---|---|---|---|
| 1 | • |   |   |   | • |   |   | 12.07 | 1.43 |
| 2 |   | • |   |   | • |   |   | 8.45 | 1.42 |
| 3 |   |   | • |   | • |   |   | 5.93 | 1.43 |
| 4 |   |   |   | • | • |   |   | 4.14 | 1.42 |
| 5 | • |   |   |   |   | • |   | 2.92 | 1.43 |
| 6 |   | • |   |   |   | • |   | 2.04 | 1.42 |
| 7 |   |   | • |   |   | • |   | 1.43 | 1.43 |
| 8 |   |   |   | • |   | • |   | 1.00 |  |
| R |   |   |   |   | • |   | • | 11.00 |  |

| Gear Set | i |
|---|---|
| I | 3.50 |
| II | 1.94 |
| III | 1.14 |
| IV | 0.80 |
| V | 0.39 |
| VI | 0.80 |
| W | 3.23 |

| Separating Clutch / Gear | a | b | c | d | e | f | g | u | φ |
|---|---|---|---|---|---|---|---|---|---|
| 1 | • | | | | • | | | 8.98 | |
| 2 | | • | | | • | | | 4.98 | 1.80 |
| 3 | | | • | | • | | | 2.92 | 1.71 |
| 4 | | | | • | • | | | 2.05 | 1.43 |
| 5 | | | • | | | | • | 1.43 | 1.44 |
| 6 | | | | • | | | • | 1.00 | 1.43 |
| R | | | | | • | • | | 8.28 | |

VEHICLE GEARBOX

This application is a national stage completion of PCT/EP02/04268 filed Apr. 18, 2002 which claims priority from German Application Serial No. 101 20 060.9 filed Apr. 24, 2001.

FIELD OF THE INVENTION

The invention regards a vehicle gearbox.

BACKGROUND OF THE INVENTION

A vehicle gearbox in a gear reduction assembly form is, with respect to construction and especially with respect to price, a very advantageous solution to gear boxes. Generally, they have a countershaft situated parallel to the input shaft and a drive shaft. The power flows over a set of gears from the input shaft to the countershaft and from there over another set of gears to the drive shaft. One of the gear sets, which is involved at all speeds and is referred to as a constant, has two fixed gears attached to each other and are situated on each of the countershafts or on the input shaft or the drive shaft, as the case may be. The other set of gears has an idler and a fixed gear. Each is related to one speed and is shifted so that the idler becomes engaged with the appropriate shaft through a separating clutch mechanism. The set of gears for the reverse speed, also referred to as the reversing gear, also includes an intermediate gear which, on the one hand mates with an idler and, on the other hand, with the fixed gear and thus reverses the rotating direction of the drive shaft with respect to the input shaft.

Generally, the separating clutch mechanisms are arranged so that they can be engaged in succession by a driver using the mechanical actuating elements in that he engages a gear shift lever in two mutually arranged perpendicular movement levels. The motion at the first movement level selects two gears of a gearshift gap and one of the selected gears is shifted by the motion in the second movement direction.

In order to drive a vehicle engine within an optimal operating range, it is desirable to have a transmission with many gear shifts, whereby the progressive ratios between the individual gear shifts, from the highest to the lowest gear, should increase progressively. In this way, by using a fine graduation, the driver can fine-tune the number of revolutions to the speed of the vehicle. Furthermore, the entire transmission range of the vehicle gearbox between the first and the highest gear should be wide, so that the relationship of the transmission range to the number of gears should be relatively large in order to keep construction costs low. Such a vehicle gearbox can be made at a justifiable expense with up to six forward speeds.

The construction cost of a vehicle gearbox with several forward speeds can be further reduced in that multiple uses can be made of individual gear sets so that they may be used to create different speeds. For example, in the case of a group of gearboxes consisting of the main gearbox group, a supplemental gearbox group consisting of two or more gear sets will go either up- and/or downstream, so that we can achieve the maximum number of gears in the vehicle gearbox from a combination of gear sets of the supplemental gearbox groups from the product of the number of gears of the individual gearbox groups. The progressive ratio between gear sets of the supplemental gearbox group will thus be adjusted to the progressive ratio between the gear sets of the main transmission groups so that an overall usable gradation of the vehicle gearbox will be achieved. Based on the group design of the vehicle, generally only a geometric, rather than a progressive gradation of the entire transmission ranges is possible with gearboxes, since the multiple use of the gear sets of the main gearbox group are repeated many times because of the progressive ratios of the main gearbox group.

Generally, while the supplemental gearbox group will be designed as a so-called split gearbox group, the progressive ratios of the main gearbox group are subdivided as so-called area gearbox groups of the transmission range of the main gearbox group and expanded up- or downwards. While the main gearbox group is usually designed so that it can be shifted with mechanical means by hand power, the supplemental gearbox group can be operated by external power, for example, electrically, hydraulically, or pneumatically. Such gearbox groups for transmissions with eight or more gears are known from the Construction Books, Band 26, by Johannes Looman, Cogged Wheel Transmissions, 1970 Springer Publishing, Berlin, pp. 181 ff.

Furthermore, due to the intensity of the competition, it is necessary to design gearbox families for different power requirements and interchange many of the same parts in order to reduce costs. It is known that gearboxes are built according to the modular building block principle for this reason.

The basic goal of the invention is to provide a vehicle gearbox in a six-gear version and an eight-gear version with the same external measurements by using a large number of the same parts.

SUMMARY OF THE INVENTION

According to the invention, the gear shift and idlers of the main gearbox group are configured on the input shaft, while the idlers of the area gearbox group are arranged on the countershaft, whereby the gear schematic, a gear shifting mechanism, and a gearbox housing are the same for a vehicle gearbox with six forward gears as for a vehicle gearbox with eight forward gears. An important advantage is that the cost-intensive gearbox housing is the same for both versions and requires the same amount of space. Thus, depending upon user requirements, a six gear version or an eight gear version of the vehicle gearbox can be installed at very little expense. Based on the same transmission design, essentially the same gear shifting mechanisms can be used, whereby, it is convenient that the main gearbox group can be operated mechanically by hand power, whereas the area gearbox group can be switched with help of an assisted shift mechanism.

The difference between the six gear version and the eight gear version is primarily that in the eight gear version, the four gear sets of the main gearbox group for the forward speeds act in combination with a gear set of the area gearbox group and then switch again to the first gear set of the main gearbox group, while the area gearbox group switches to another gear set. In the case of the six gear version, the area gearbox group is switched after the first four gears are engaged, while the main gearbox group of the fourth gear set of the fourth gear switches to the third gear set of the third gear so that, in addition to the first four gears, two additional forward speeds are also available. It is useful in this version that the selected progressive ratio of the area gearbox group is approximately equal to the square of the progressive ratio between the third and the fourth speed.

Since the first and the second gear sets of the main gearbox group are used only once, specifically in first and second gear, the progressive ratio in this gearbox version between the first four gears can increase to the first gear so that, in spite of a reduced number of gears, a large gearbox spread with a finer progression can be achieved in the upper gear ranges. When, for example, one selects a ratio of approximately 3.5 for the first set of gears, approximately 1.94 for the second gear set, approximately 1.14 for the third gear set, about 0.80 for the fourth gear set, approximately 0.39 for the fifth gear set, and for the sixth gear set approximately 0.80, and a gear ratio spread of 9.0 between the first and the second gear, one achieves a gear ratio of 1.8 between the first and the second gears, 1.71 between the second and the third gears, 1.43 between third and fourth gears, 1.44 between the fourth and fifth gears, and 1.43 between the fifth and sixth gears. The reversing wheel will have a ratio of 3.23 for the reverse gear, which provides for a ratio of 8.28 for the reverse gear in connection with the fifth set of gears.

For the eight gear version, the following ratios are approximately advantageous: 3.5 for the first set of gears, 2.45 for the second set of gears, 1.72 for the third set of gears, 1.20 for the fourth set of gears, 0.29 for the fifth set of gears, and 1.20 for the sixth set of gears. That provides a ratio spread of about 12 with a geometric progression, with a progressive ratio of about 1.43. The reversing wheel will receive a ratio of 3.16, so that the connection with the fifth set of gears provides for a transmission ratio of 11 for the reverse gear.

BRIEF DESCRIPTION OF THE DRAWINGS

The invention will now be described, by way of example, with reference to the accompanying drawings in which.

DETAILED DESCRIPTION OF THE INVENTION

Figure 1:
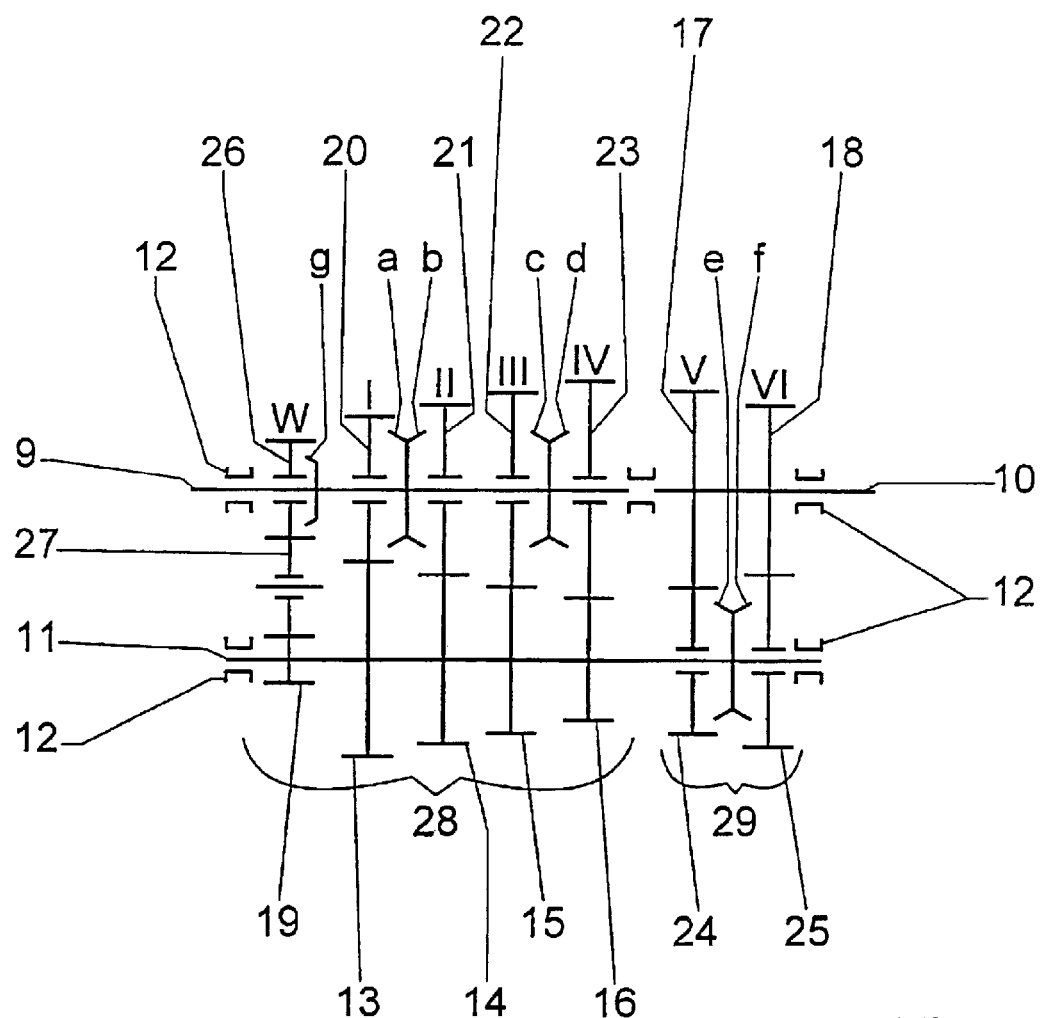
FIG. 1 is a gearbox schematic for all vehicle gearboxes in the six gear version and an eight gear version.

The gearbox schematic represented in FIG. 1 is applicable for a six gear version and an eight gear version of the vehicle gearbox. It comprises a main gear box group 28 with the first to fourth gear sets I to IV, as well as the reversing gear set W, and a downstream area gearbox group 29 with a fifth gear set V and a sixth gear set VI. The gear sets one-through-six, I to VI, and the reversing gear set W each have an idler 20 to 26 and a fixed gear 13 though 19. The idlers 20 to 23 and 26 of the main gear box group are resting on a drive shaft 9 and can be coupled with it through separating clutches a, b, c, d, and g. The separating clutches a, b, c, d, and g are switched in a convenient manner through a hand shift mechanism that is not shown in detail. The fixed gears 13 through 16 and 19 are seated on an axis parallel to the counter shaft drive shaft 9.

The fixed gears 17 and 18 of the area gearbox group 29 rest on a drive shaft 10, while the idlers 24 and 25 that go with it are seated on the countershaft 11 and can be coupled with it across separating clutches e and f. The separating clutches e and f are purposefully engaged by a power assist operation gear shift mechanism, for example, electrically, hydraulically, or pneumatically, which is not represented here. The input shaft 9, drive shaft 10, and the countershaft 11 are seated on bearings 12 of a gear box housing that is not shown.

Figures 2, 3, 4:
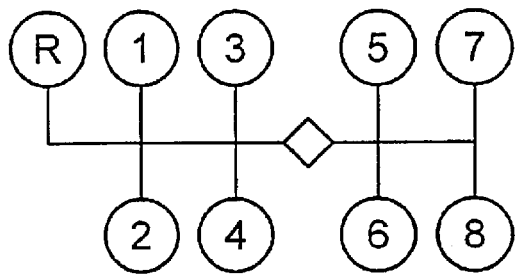
FIG. 2 is a gear shift schematic for an eight gear version.
FIG. 3 is a table with the gear sets ratios of an eight gear version.
FIG. 4 is a tabular shift logic for the eight gear version.

FIG. 2 shows a gear shift schematic of the vehicle gear box in the eight gear version, wherein the reverse gear R, the first gear 1, the third gear 3, the fifth gear 5, and the seventh gear 7 are shifted to the forward driving direction of the vehicle, while the second gear 2, the fourth gear 4, the sixth gear 5, and the eighth gear 8 are engaged in the opposite direction. In switching from the gear shift gap of the third and fourth gear 3 and 4, the shift gaps of the fifth or sixth gear 5 and 6 are activated by the power assist gear shift mechanism of the area gearbox group 29, while in the main gearbox group 28, the gear is shifted back to the first or, as the case may be, second gear 1 or 2.

FIG. 4 shows a corresponding gear shift logic. Black points indicate which separating clutches a through g are engaged in the individual gears 1 through 8 and R. From the individual ratios i of the gear sets I to VI and W according to table in FIG. 3, we can obtain the gear ratios u according to the next-to-last column in FIG. 4 with a appropriate progressive ratios φ according to the last column in FIG. 4.

Figures 5, 6, 7:
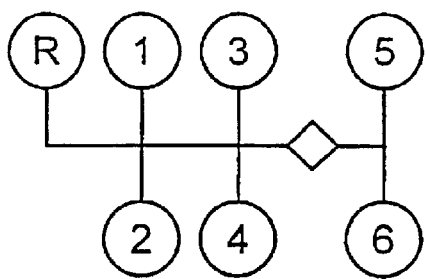
FIG. 5 is a gear shift schematic for a six gear version.
FIG. 6 is a table with the gear sets ratios of the six gear version.
FIG. 7 is a tabular shift logic for the six gear version.

The same gear box schematic according to FIG. 1 is also applicable for a six gear version of the vehicle gear box. In this case, FIG. 5 through 7 show a useful gear shifting schematic, advantageous individual transmissions ratios i for the gear sets I through VI and W and a suitable gear shift logic. In the case of the gear shift schematic according to FIG. 5, the first gear 1 and the third gear 3 are in the reverse gear R, and the fifth gear is in the forward direction, while the second gear 2, the fourth gear 4 and the sixth gear 6 are positioned in the reverse driving direction. In this case as well, the first four gears 1 through 4 can be shifted mechanically by hand, while the area gear box group 29 is engaged by power assist in transition from the shift gap of the third and fourth gears 3 and 4 into the shift gap of the fifth and sixth gears 5 and 6.

In the first four gears 1 through 4, the power flow is channeled across the fifth gear set V of the area gearbox group 29 always across the first to fourth gear sets I to IV of the main gearbox 28. In a shift to the fifth gear or, as the case may be, sixth gear 6, the area gearbox group 29 is shifted to the sixth gear set VI, while in the main gearbox group 28, the third gear set II, or as the case may be, the fourth gear set IV is shifted. The progressive ratio φ of the area gear box group 29 between the fifth gear set V with a transmission ratio i of 0.39 and the sixth gear set VI with a transmission ratio i of 0.8, equals 2.05 and thus approximately equal to the square of the progressive ratio φ between the third and fourth gear 3 and 4, which is equal to 2.05. Thus, toward the first gear, there are progressive ratios φ of 1.43 between the third and the fourth gear 3 and 4, 1.71 between the second and third gear 2 and 3 and 1.80 between the first gear 1 and the second gear 2. The progressive ratios φ between the fourth gear 4 and the fifth gear 5, as well as the fifth gear 5 and the sixth gear 6 are equal to each other at about 1.43. There is thus a fine progression in the higher gears 4 through 6.

It is apparent from the shift gear logic according to FIG. 7 that the power flow is conducted in the first four gears 1 through 4 as in the eight gear version across the fifth gear set V and each across one of the first four gear sets I through IV. In the firth gear 5 and sixth gear 6, the power flow is conducted across the sixth gear set VI and across the third gear set III or, as the case may be, across the fourth gear set IV. The reverse gear R is created though the reversing gear set W and is depicted in the gear set V in that the corresponding separating clutches e and g are engaged. Together with the transmission ratio of the reversing gear set W of 3.23 the result of a gear box transmission in the reverse gear R is 8.28.

| Reference numerals |
| --- |
| 1 first gear |
| 2 second gear |
| 3 third gear |
| 4 fourth gear |
| 5 fifth gear |
| 6 sixth gear |
| 7 seventh gear |
| 8 eighth gear |
| 9 input shaft |
| 10 drive shaft |
| 11 countershaft |
| 12 bearings |
| 13 first fixed gear |
| 14 second fixed gear |
| 15 third fixed gear |
| 16 fourth fixed gear |
| 17 fifth fixed gear |
| 18 sixth fixed gear |
| 19 seventh fixed gear |
| 20 first idler |
| 21 second idler |
| 22 third idler |
| 23 fourth idler |
| 24 fifth idler |
| 25 sixth idler |
| 26 seventh idler |
| 27 intermediate timing gear |
| 28 main gear box group |
| 29 area gear box group |
| I first gear set |
| II second gear set |
| III third gear set |
| IV fourth gearset |
| V fifth gear set |
| VI sixth gear set |
| W reversing gear set |
| R reverse gear |
| a first separating clutch |
| b second separating clutch |
| c third separating clutch |
| d fourth separating clutch |
| e fifth separating clutch |
| f sixth separating clutch |
| g seventh separating clutch |
| u gear box ratio |
| i gear ratio |
| φ progressive ratio |

What is claimed is:

1. A vehicle gearbox with an input shaft (9), a drive shaft (10) and a countershaft (11), the countershaft (11), is arranged parallel to an axis of the input and drive shafts (9 and 10) and can be connected power-wise over a first, second, third, fourth, fifth and sixth gear sets (I, II, III, IV, V and VI) and reversing near set (W) by means of a plurality of separating clutches (a, b, C, d, e, f and g), wherein a main gearbox group (28) has the first, second, third, fourth and reversing gear sets (I, II, III, IV and W), each respectively having an idler (20, 21, 22, 23, and 26) and a fixed gear (13, 14, 15, 16, and 19), and a downstream area gearbox group (29) has the fifth and sixth gear sets (V and VI) each respectively having an idler (24 or 25) and a fixed gear (17 or 18), the separating clutches (a, b, c, d, and g) and the idlers (20, 21, 22, 23, 26) of the main gearbox group (28) are arranged on the input shaft (11), the idlers (24 and 25) of the range gearbox group (29) are arranged on the countershaft (11), and wherein a gearbox schematic, a shifting mechanism and a gearbox housing for a vehicle gearbox with six forward gears (1 through 6) are equivalent to a gearbox schematic, a shifting mechanism and a gearbox housing for a vehicle gearbox with eight forward gears (1 to 8).

2. The vehicle gear box according to claim 1, wherein in case of a vehicle gear box with the six forward gears (1 through 6), the six forward gears (1 through 6) generate a progressive ratio (φ) of the range gearbox group (29) about equal to the square of a progressive ratio (φ) between third and fourth forward gears (3 and 4) and the third gear set (III) with the sixth gear set (VI) of fifth forward gear (5) and the fourth gear set (IV) with the sixth gear set (VI) and sixth forward gear (6).

3. The vehicle gearbox according to claim 1, wherein in case of a vehicle gear box with the six forward gears (1 through 6), a progressive ratio (φ) between first, second, third and fourth gears (1, 2, 3, and 4) increases progressively toward a first gear (1).

4. The vehicle gearbox according to claim 1, wherein in the case of a vehicle gear box with six forward gears (1 through 6), the first, second, third, fourth, fifth, sixth and reversing gear sets (I, II, III, IV, V, VI and W ) have approximately the following gear ratios (i): the first gear set (I) 3.5, the second gear set (II) 1.94, the third gear set (III) 1.14, the fourth gear set (IV) 0.80, the fifth gear set (V) 0.39, the sixth gear set (VI) 0.80, and the reversing gear set (W) 3.16.

5. The vehicle gearbox according to claim 1, wherein in the case of a vehicle gear box with eight forward gears (1 through 8), the first, second, third, fourth, fifth, sixth and reversing gear sets (I, II, III, IV, V, VI and W ) have approximately the following gear ratios (i): the first gear set (I) 3.5, the second gear set (II) 2.45, the third gear set (III) 1.72, the fourth gear set (IV) 1.20, the fifth gear set (V) 0.29, the sixth gear set (VI) 1.20, and the reversing gear set (W) 3.16.

* * * * *